(12) United States Patent
Soofer

(10) Patent No.: US 10,231,039 B2
(45) Date of Patent: Mar. 12, 2019

(54) ROCK SPEAKER

(71) Applicant: Alpine Corporation, Los Angeles, CA (US)

(72) Inventor: Sohrab Robby Soofer, Beverly Hills, CA (US)

(*) Notice: Subject to any disclaimer, the term of this patent is extended or adjusted under 35 U.S.C. 154(b) by 15 days.

(21) Appl. No.: 15/427,006

(22) Filed: Feb. 7, 2017

(65) Prior Publication Data
US 2017/0230739 A1 Aug. 10, 2017

Related U.S. Application Data

(63) Continuation-in-part of application No. 29/579,611, filed on Sep. 30, 2016.

(60) Provisional application No. 62/292,767, filed on Feb. 8, 2016.

(51) Int. Cl.
| H02J 7/35 | (2006.01) |
| H04R 1/02 | (2006.01) |
| H04R 1/44 | (2006.01) |
| H04R 3/00 | (2006.01) |
| H04R 7/12 | (2006.01) |
| H02S 40/38 | (2014.01) |

(52) U.S. Cl.
CPC .............. *H04R 1/025* (2013.01); *H02J 7/355* (2013.01); *H02S 40/38* (2014.12); *H04R 3/00* (2013.01); *H04R 1/023* (2013.01); *H04R 1/44* (2013.01); *H04R 7/127* (2013.01); *H04R 2420/07* (2013.01); *H04R 2420/09* (2013.01)

(58) Field of Classification Search
None
See application file for complete search history.

(56) References Cited

U.S. PATENT DOCUMENTS

| 4,754,852 A * | 7/1988 | Mule .................... H04R 1/02 181/144 |
| 9,232,290 B2 | 1/2016 | Besay |
| 2011/0212683 A1* | 9/2011 | Ortiz .................. H04W 56/00 455/3.06 |
| 2012/0300962 A1 | 11/2012 | Devoto |
| 2013/0294952 A1* | 11/2013 | Caprathe ........... F04D 25/0673 417/411 |
| 2015/0010189 A1* | 1/2015 | Besay .................. H04R 1/028 381/334 |

OTHER PUBLICATIONS

Beige Sandstone 50 W Plastic Outdoor Rock Speaker, accessed on Jan. 7, 2016.
Search links, accessed on Jan. 7 2016.

* cited by examiner

Primary Examiner — Yogeshkumar Patel
(74) Attorney, Agent, or Firm — Payam Moradian

(57) ABSTRACT

Provided is a speaker simulating a rock comprising: a) a housing simulating a rock, the housing having a plurality of openings; b) a loudspeaker placed inside of the housing, audio from the loudspeaker leaving the housing through the openings; c) a solar panel attached to the housing in a configuration that allows light from outside of the housing to contact the solar panel to generate electricity; d) a rechargeable battery to be charged by the electricity from the solar panel, the rechargeable battery powering the loudspeaker; e) a wireless processor configured to communicate with a wireless protocol to obtain audio content; wherein the speaker plays the audio content received from the wireless communication through the loudspeaker.

11 Claims, 7 Drawing Sheets

ROCK SPEAKER

CROSS-REFERENCE

The present application claims the benefit of U.S. provisional Appl. No. 62/292,767, filed on Feb. 8, 2016, and is a continuation-in-part of U.S. Design patent application No. 29/579,611, filed on Sep. 30, 2016, all of which are incorporated herein by reference in their entirety.

BACKGROUND SECTION OF THE INVENTION

People enjoy listening to music. One problem with listening to music in a garden setting is that speakers are not waterproof, may need wiring to be charged and to communicate, may not blend with the garden, and not be practical for use in a garden. There is a need in the art for a speaker that is suitable for use in a garden environment.

SUMMARY SECTION OF THE INVENTION

Provided is a speaker simulating a rock comprising: a) a housing simulating a rock, the housing having a plurality of openings; b) a loudspeaker placed inside of the housing, audio from the loudspeaker leaving the housing through the openings; c) a solar panel attached to the housing in a configuration that allows light from outside of the housing to contact the solar panel to generate electricity, d) a rechargeable battery to be charged by the electricity from the solar panel, the rechargeable battery powering the loudspeaker, and e) a wireless processor configured to communicate with a wireless protocol to obtain audio content; wherein the speaker plays the audio content received from the wireless communication through the loudspeaker. The openings can be irregularly shaped. The solar panel can be attached at an angle. The solar panel can be attached in such way that a surface of the solar panel configured to receive the light is directed upwards and backwards in comparison to the openings. The solar panel can be rectangular. A first length of the rectangle closer to the openings can be placed at a higher elevation compared to a second parallel length of the rectangle. The housing can have a top portion that blocks viewing of the solar panel when looking at the housing from a front direction in a horizontal manner above a center of the loudspeaker. The wireless protocol can be Bluetooth protocol. The audio content can be played as a live stream. The audio content can be stored in a memory first before being played. The back of the housing can have an additional opening for placement of electronic components. A container can be placed in the housing, the container accessible from outside of the housing, the container housing the rechargeable battery and a circuit board. A switch and a port can be attached to the circuit board, the switch and the port accessible from outside of the housing. A net and a grill can be placed inside of the housing in between front of the loudspeaker and the openings. The speaker can be waterproof. An additional speaker can comprise items (a) to (e), the two speakers configured to play synchronously audio content received from the wireless communication.

Provided is a speaker simulating a rock comprising: a) a housing simulating a rock, the housing having a plurality of openings; b) a loudspeaker placed inside of the housing, audio from the loudspeaker leaving the housing through the openings; c) a rectangular solar panel attached to the housing at an angle in a configuration that allows light from outside of the housing to contact the solar panel to generate electricity, the solar panel attached in such way that a surface of the solar panel configured to receive light is directed upwards and backwards in comparison to the openings; d) a rechargeable battery to be charged by the electricity from the solar panel, the rechargeable battery powering the loudspeaker, and e) a Bluetooth processor configured to communicate in a wireless fashion to obtain audio content; wherein the speaker plays the audio content received from the wireless communication through the loudspeaker wherein the housing blocks viewing of the solar panel when looking at the speaker from a front direction in a horizontal manner above a center of the loudspeaker.

Provided is a speaker simulating a rock comprising: a) a housing simulating a rock, the housing having a plurality of openings; b) a loudspeaker placed inside of the housing, audio from the loudspeaker leaving the housing through the openings; c) a rectangular solar panel attached to the housing at an angle in a configuration that allows light from outside of the housing to contact the solar panel to generate electricity, the solar panel attached in such way that a surface of the solar panel configured to receive light is directed upwards and backwards in comparison to the openings; d) a rechargeable battery to be charged by the electricity from the solar panel, the rechargeable battery powering the loudspeaker, e) a Bluetooth processor configured to communicate in a wireless fashion to obtain audio content; f) a back opening in a back of the housing on opposite side of the openings; g) a container placed inside of the housing, the container accessible though the back opening, the container housing the battery and a circuit board; and h) a port and a switch attached to the circuit board, the port and the switch assessable from outside of the back opening, wherein the speaker plays the audio content received from the wireless communication through the loudspeaker, wherein the housing blocks viewing of the solar panel when looking at the speaker from a front direction in a horizontal manner above a center of the loudspeaker. The port can be configured for use to charge the battery from an outside source. The port can be configured for use to charge a smart phone.

DETAILED DESCRIPTION OF THE INVENTION

Provided is a speaker encased in a rock shaped housing for outdoor use, such as for placement in a garden. The speaker can be solar and be configured to communicate with wireless protocol. A user can connect to the speaker in a wireless fashion and play audio over the speaker.

Figure 1:
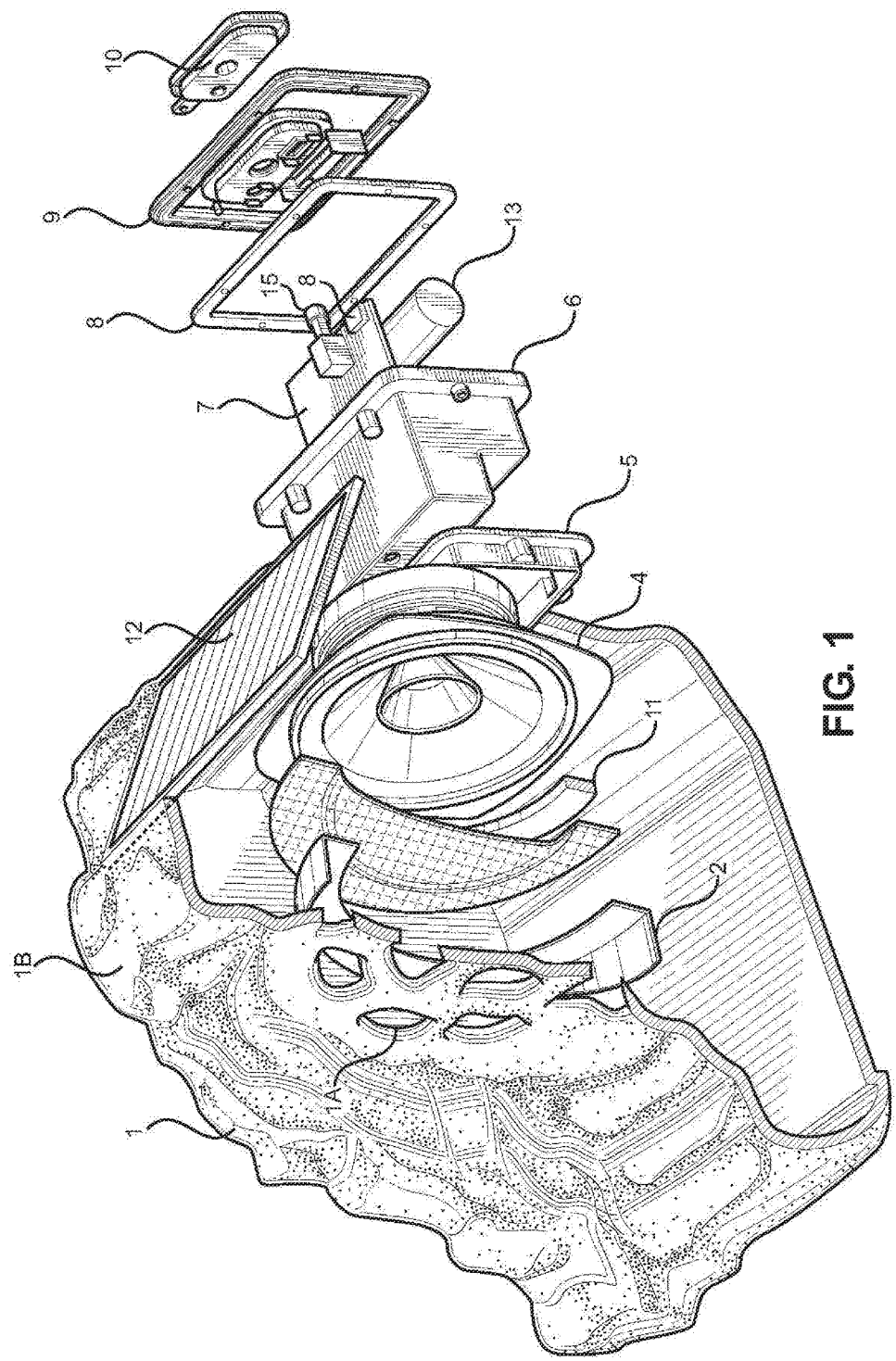
FIG. 1 illustrates exploded view of the speaker.

FIG. 1 illustrates an exploded view of the rock speaker. The housing (housing) 1 can be made from a synthetic material such as plastic. The housing can have a flat bottom for placement of the housing on a surface. The housing can have a plurality of irregularly shaped openings 1A that are configured to allow sound that is produced by the speaker to travel from the inside of the housing to the outside of the housing. The speaker system can be waterproof and sealed. The housing 1 can be made from a material that is of low heat conductivity so that the housing retains a reasonable temperature regardless of weather conditions.

The cone of the speaker that produces sound (diaphragm) faces the openings 1A of the housing 1. Openings 1A can be spaced apart from each other in such arrangement that forms a circle. In between the housing 1 and the face of the speaker 4, there can be a sealing ring 11, a speaker net 3, and a speaker grill 3. The speaker grill 3 can be attached to the housing with a fastener, such as a screw, and hold the sealing ring 11 and the speaker net 3. The grill 2 can be in the shape of a ring that goes around the openings in the housing 1.

In the back or side of the housing 1 there can be electronic access to the speaker inside of the housing 1. An opening in the housing 1 can allow for placement of a cover 9, which can be sealed with ring 8. A circuit board 7 with a processor can be placed on the inside of the housing 1, to which access can be made through the cover 9. The processor 17 on the circuit board 7 can be in electronic communication with a port, such as a USB port 22, which can be accessed from outside of the housing 1 through an opening in the cover 9. There can also be a switch 15 for turning on and off the speaker which can be accessed from outside of the housing 1. The main processor 17 can further be in communication with a processor 19 configured for wireless communication, such as Bluetooth (Bluetooth chip).

A battery/electronics 6 housing can be placed inside of the speaker housing 1. The battery housing 6 contains one or more batteries 13, such as rechargeable batteries that are in electronic communication with the speaker 4, and power the speaker. Circuit board 7 can also be placed in battery housing 6. Battery housing 6 can be enclosed with cover 9 and waterproof ring 8 to make the housing waterproof. Cover 9 has a depression configured from placement of waterproof cap 10. Waterproof cap 10 seals the openings of port 22 and switch 15, which can be accessed from outside of housing 1 when waterproof cap 10 is removed. The housing 6 can be attached to fixed member 6 with a fastener. A fastener can be used to attach cover 9, ring 8, and housing 6 together.

A solar panel 12 can be placed on the housing in a configuration that allows ambient light to contact the solar panel. Typically, the housing 1 has an opening on top, and the solar panel is placed on the opening, and seals the opening on top. The solar panel 12 charges the rechargeable battery. The solar panel 12 can be placed at an angle. The solar panel 12 can be rectangular in shape and be placed in such configuration that the long side of the rectangle closest to the front of the speaker has higher elevation compared to the parallel length of the rectangle that is closest to the back of the back speaker. The angle can be 20 to about 70 degrees. The speaker housing 1 can have a front top portion 1B that blocks viewing of the solar panel when looked at from the front in a horizontal direction. The angle of the solar panel 12 allows for making a more compact housing 1 to fit the solar panel 12 and further diminishes the visibility of the solar panel from the front to avoid glare and also to make the speaker to more resemble a natural rock.

Figure 2:
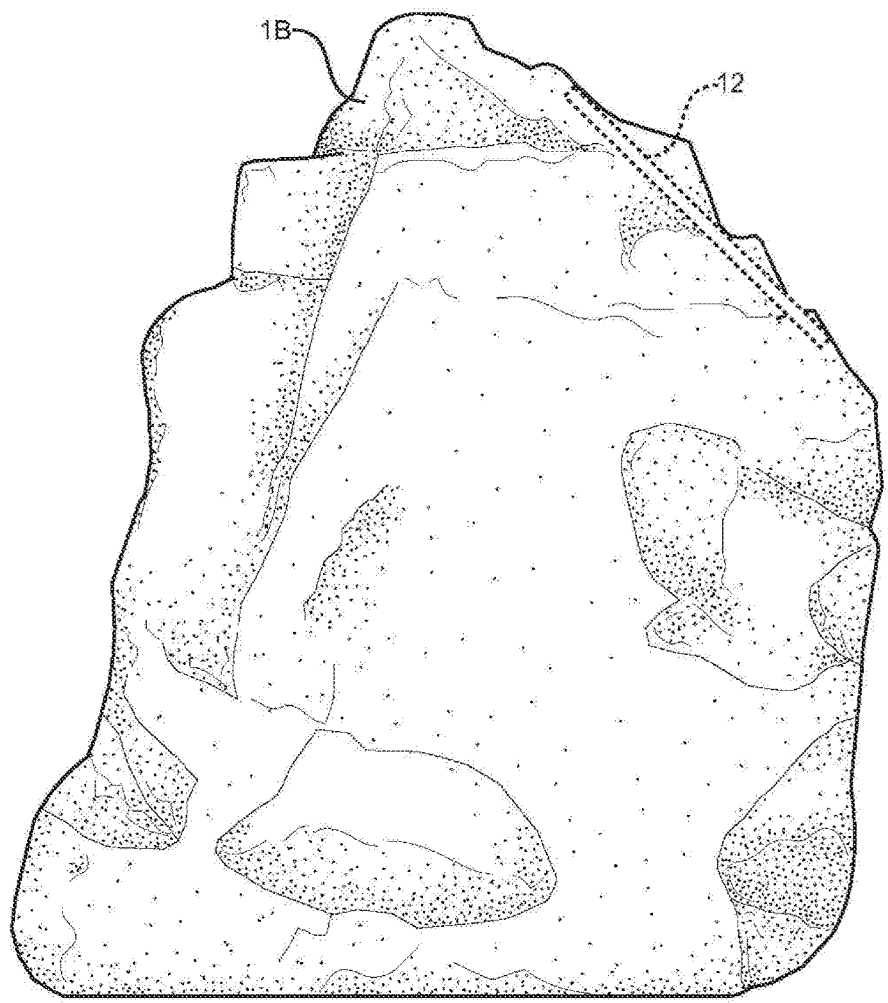
FIG. 2 is a right side view of the speaker.
Figure 6:
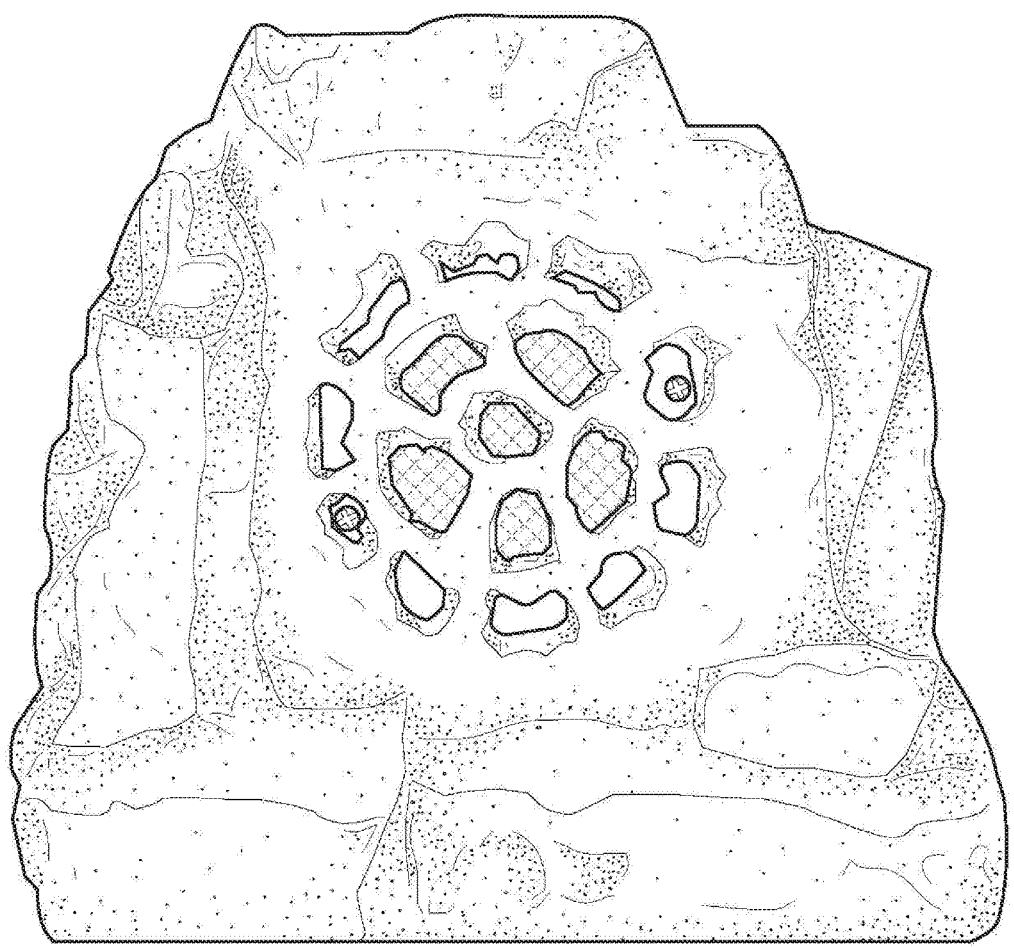
FIG. 6 illustrates a front view of the speaker.
Figure 7:
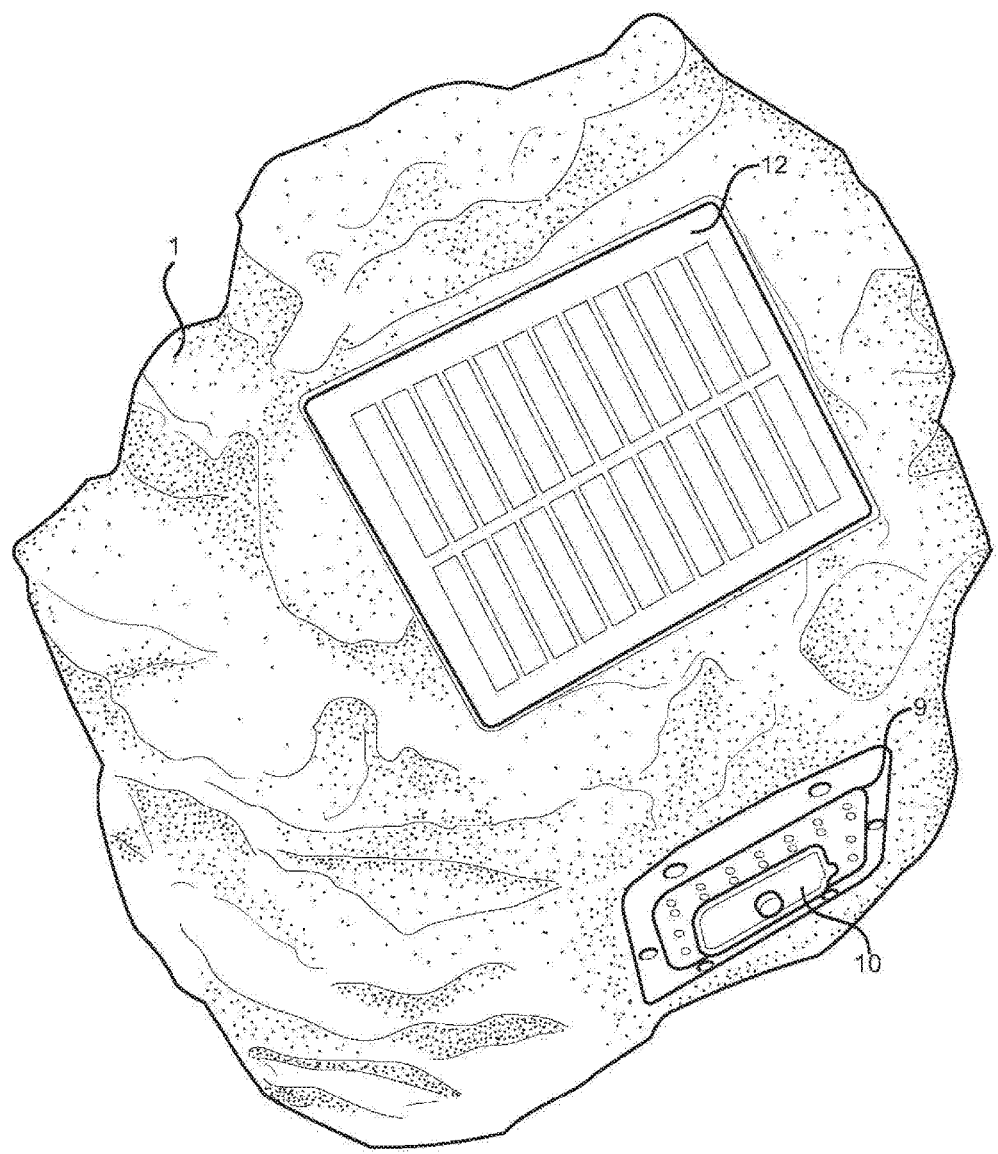
FIG. 7 illustrates a back perspective view of the speaker.

FIGS. 2, 6, and 7 illustrate different views of the speaker housing 1. FIG. 2 illustrates a right side of housing the rock speaker. Solar panel 12 is placed at angle behind the top portion of the front of the housing. The top of solar panel is placed lower than the top of the top portion of the housing. FIG. 6 illustrates a front side view of the rock speaker. In the front view, irregularly shaped openings arranged in the shape of a circle are visible. The speaker net can be seen behind each opening. The solar panel 12 is not visible in this view. FIG. 7 illustrates a top perspective view of the back of the speaker. The solar panel is placed on top at an angle (slant) where the outside surface of the solar panel faces about 20 to 70 degrees towards the back. The battery box is placed at another opening in the back that is substantially vertical. The speaker has a flat bottom for placement over a surface.

Figure 3:
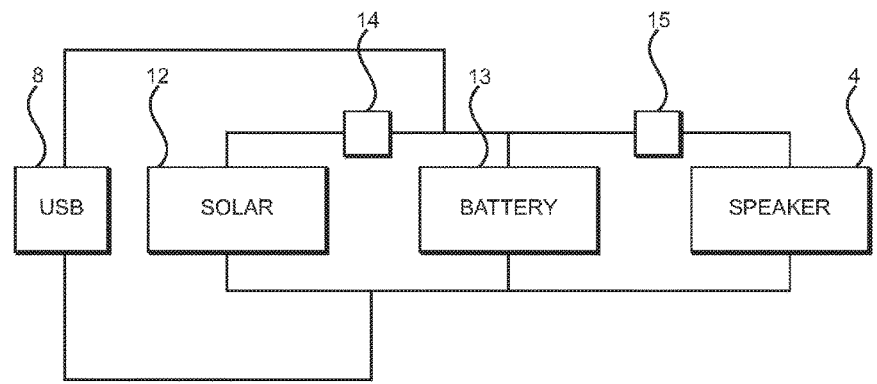
FIG. 3 illustrates electronic communication between the solar panel, battery, and loudspeaker.

FIG. 3 illustrates an exemplary electronic connection between the solar panel 12, battery 13, and loudspeaker 4. An internal switch 14 can be present in between the solar panel and the battery 13. The electronics can further include a light sensor, which can switch on or off the charging of the rechargeable battery when the ambient light level is below a certain threshold. When light falls below a predetermined level, the internal switch 14 may cut power from the solar panel to the battery. In another embodiment, the internal switch does not exist. An external switch 15 can be used to cut power from the battery to the speaker, and/or entirely shut does the speaker system other than for allowing the battery to be charged by the solar panel. USB 8 can also be used to attach an external source of electricity to charge battery 13 or alternatively, to charge a smart phone or other electronic device with battery 13.

Figure 4:
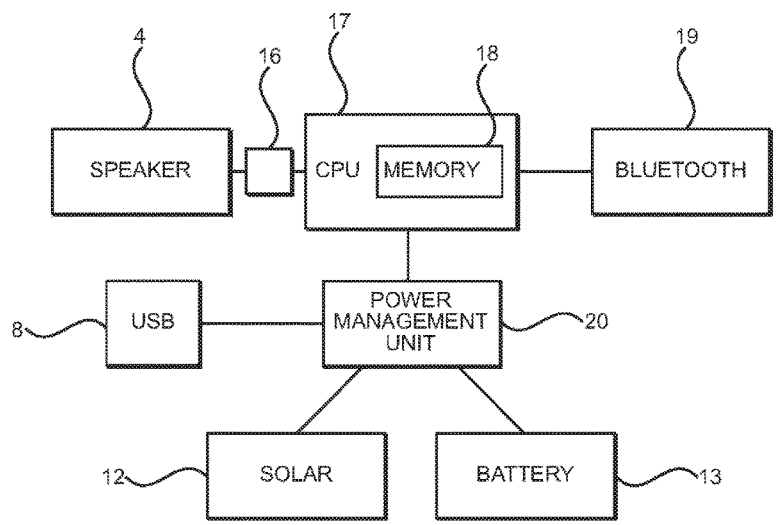
FIG. 4 illustrates electronic components of the speaker.

FIG. 4 illustrates exemplary communication between the different electronic components. CPU (Central processor unit) 17 can be a microcontroller with internal memory 18 CPU (Central processor unit) 17 can be in communication with speaker 4 through driver 16. CPU 17 can also be in communication with a Power Management Unit 20 can control and monitor the electrical current and voltage of the speaker system, including battery 13, solar panel 12, and external source of electricity or smart phone attached to USB 8. CPU 17 can also be in communication with Bluetooth chip 19 configured for wireless communication.

Figure 5:
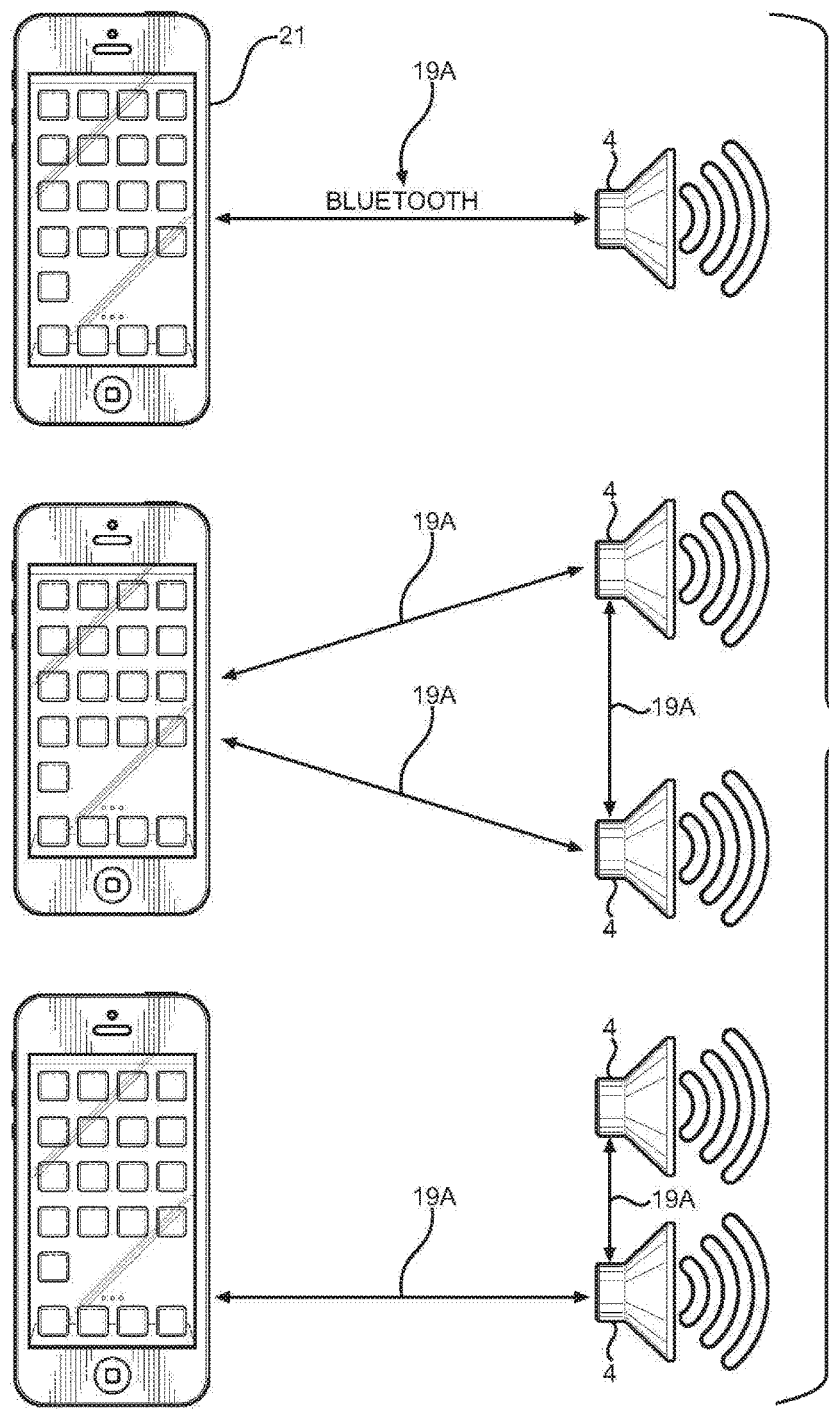
FIG. 5 illustrates alternative networking arrangements.

FIG. 5 illustrates possible networking arrangements The top arrangement illustrates a simple network with electronic device of a user (smart phone) and one speaker. The middle illustration shows a mesh network where each speaker is configured to communicate with the smart phone and every other speaker. The user's phone is also configured to communicate with each speaker. The bottom illustration shows one speaker acting as a master, and then communicating with all the other speakers, in this housing sending audio content to the other speakers.

Figure 8:
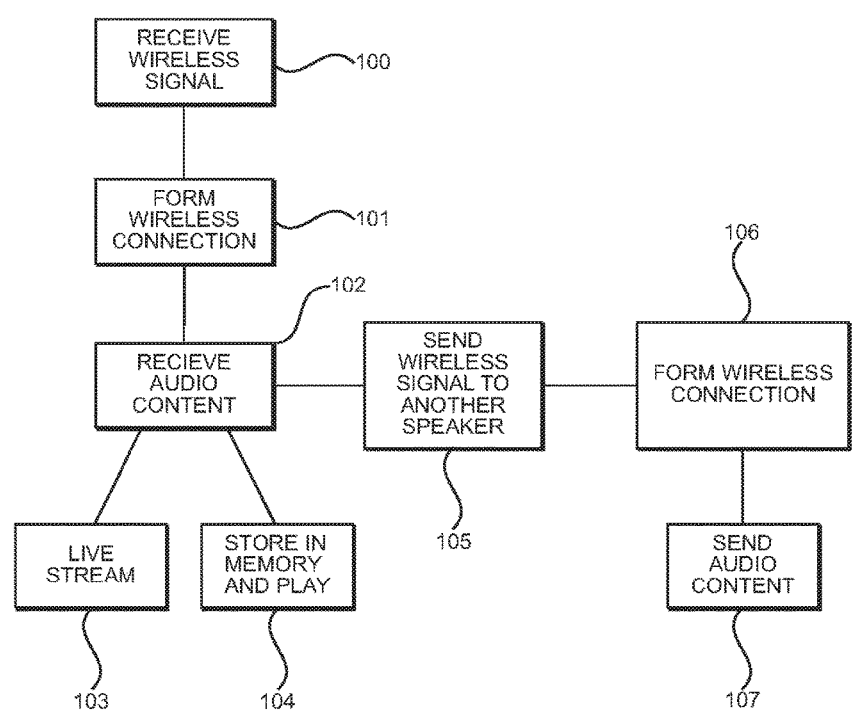
FIG. 8 illustrates a flow chart with steps for establishing wireless communication.
Figure 1:
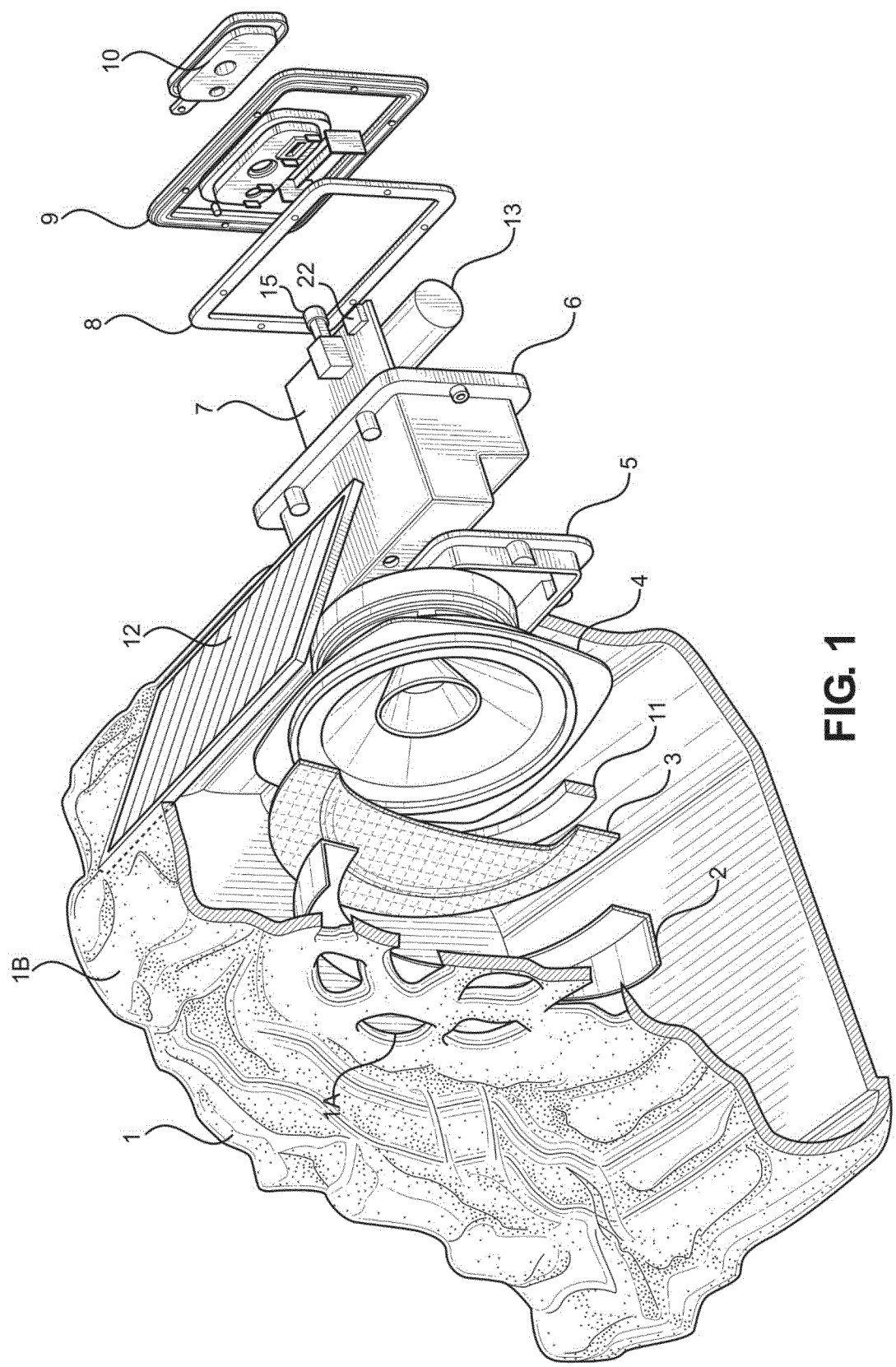

FIG. 8 illustrates wireless electronic communication between the user's device and the speaker. The user would make a wireless connection, such as by Bluetooth, to pair the speaker with a user's electronic device, such as a cellular phone, a tablet computer, or a dedicated music player. The user can then play the contents (such as songs) over the loudspeaker. After receiving a wireless signal 100, the speaker system forms connection (pairs) 101 with the user's device. The speaker then receives audio content 102 from the user's device. The audio content can be played as a live stream 103 (with a minimal buffer as needed) or stored in memory and played overtime 104. If the speaker is configured to network with other speaker, the speaker can then send a wireless signal to another speaker 105 and form a wireless connection (pair) with another speaker 106, and send the audio content 107 to the other speaker to be played in a synchronous fashion.

Alternatively, a wired connection can be made with the port (such as the USB Port) to play the audio content (songs) and/or to charge the user's electronic device. The audio content can be uploaded from a storage device like a flash drive into the speaker's memory and played over the loudspeaker overtime.

REFERENCES

1. Housing
1A. Openings in front of housing
1B. Top portion of housing
2. Loudspeaker grill
3. Loudspeaker Net
4. Loud speaker
5. Fixed box
6. Battery/electronic box
7. Circuit Board
8. Waterproof ring
9. Cover for battery box
10. waterproof cap
11. sealing ring.
12. solar panel
13. battery
14. internal switch
15. external switch
16. Speaker driver
17. CPU
18. Memory
19. Bluetooth
19A. Bluetooth communication
20. Power management unit
21. smart phone
100. Receive wireless signal
101. Form wireless connection
102. Receive audio content
103. Live stream
104. Store in memory and play
105. Send wireless signal to another speaker
106. form wireless connection
107. send audio content

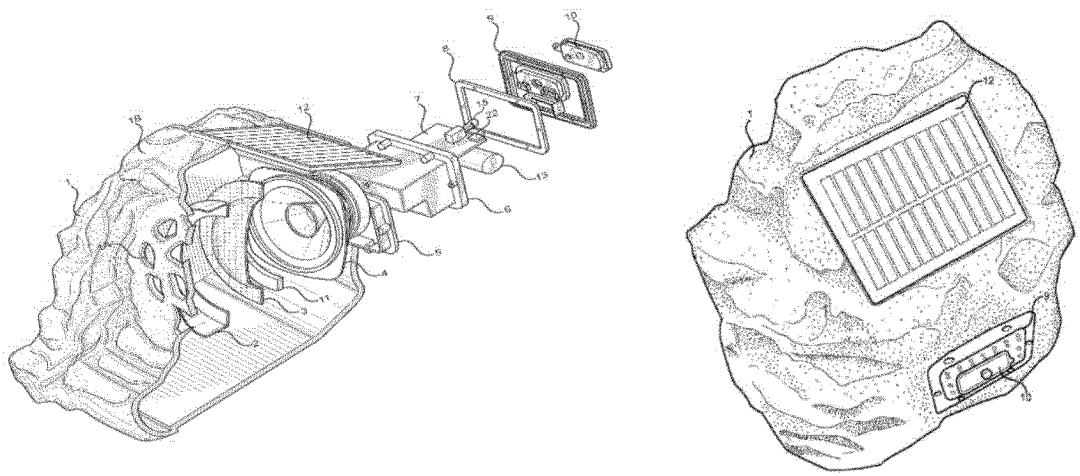

What is claimed is:

1. A speaker simulating a rock comprising:
   a) a housing simulating a rock, the housing having a plurality of openings;
   b) a loudspeaker placed inside of the housing, audio from the loudspeaker leaving the housing through the openings;
   c) a net and a grill placed inside of the housing in between front of the loudspeaker and the openings;
   d) a rectangular solar panel attached to the housing in a configuration that allows light from outside of the housing to contact the solar panel to generate electricity;
   e) a rechargeable battery to be charged by the electricity from the solar panel, the rechargeable battery powering the loudspeaker; and
   f) a wireless processor configured to communicate with a wireless protocol to obtain audio content;
   g) a second opening in the housing configured to allow access to inside of the housing; and
   h) a container placed in the housing, the container accessible from outside of the housing through the second opening, the container housing one more electronics components;
   wherein the solar panel is attached at an angle in such way that a surface of the solar panel configured to receive the light is directed upwards and backwards in comparison to the openings with a first length of the rectangle closer to the openings is placed at a higher elevation compared to a second parallel length of the rectangle;
   the housing has a top portion that blocks viewing of the solar panel when looking at the housing from a front direction in a horizontal manner above a center of the loudspeaker;
   wherein the speaker plays the audio content received from the wireless communication through the loudspeaker.

2. The speaker of claim 1, wherein the openings are irregularly shaped.

3. The speaker of claim 1, wherein the wireless protocol is Bluetooth protocol.

4. The speaker of claim 1, wherein the audio content is played as a live stream.

5. The speaker of claim 1, wherein the audio content is stored in a memory first before being played.

6. The speaker of claim 1, further comprising a switch and a port attached to a circuit board, the switch and the port accessible from the second opening.

7. The speaker of claim 1, wherein the speaker is waterproof.

8. The speaker of claim 1, further comprising an additional speaker comprising items (a) to (e), the two speakers configured to, play synchronously audio content received from the wireless communication.

9. A speaker simulating a rock comprising:
   a) a housing simulating a rock, the housing having a plurality of openings;
   b) a loudspeaker placed inside of the housing, audio from the loudspeaker leaving the housing through the openings;
   c) a rectangular solar panel attached to the housing at an angle in a configuration that allows light from outside of the housing to contact the solar panel to generate electricity, the solar panel attached in such way that a surface of the solar panel configured to receive light is directed upwards and backwards in comparison to the openings;
   d) a rechargeable battery to be charged by the electricity from the solar panel, the rechargeable battery powering the loudspeaker;
   e) a Bluetooth processor configured to communicate in a wireless fashion to obtain audio content;
   f) a back opening in a back of the housing on opposite side of the openings;
   g) a container placed inside of the housing, the container accessible though the back opening, the container housing the battery and a circuit board; and
   h) a port and a switch attached to the circuit board, the port and the switch assessable from outside of the back opening,
   wherein the speaker plays the audio content received from the wireless communication through the loudspeaker;
   wherein the housing blocks viewing of the solar panel when looking at the speaker from a front direction in a horizontal manner above a center of the loudspeaker.

10. The speaker of claim 9, wherein the port is configured for use to charge the battery from an outside source.

11. The speaker of claim 9, wherein the port is configured for use to charge a smart phone.

* * * * *

UNITED STATES PATENT AND TRADEMARK OFFICE
CERTIFICATE OF CORRECTION

PATENT NO. : 10,231,039 B2
APPLICATION NO. : 15/427006
DATED : March 12, 2019
INVENTOR(S) : Sohrab Robby Soofer It is certified that error appears in the above-identified patent and that said Letters Patent is hereby corrected as shown below:

On the Title Page

Delete the Title Page and substitute therefore with the attached Title Page consisting of the corrected illustrative figure.

In the Drawings

Please replace FIG. 1 with FIG. 1 as shown on the attached page.

In the Specification

Column 3, Line 10, replace "3" with --2-- (both occurrences)
Column 4, Line 22, replace "8" with --22--

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*

(12) United States Patent
Soofer

(10) Patent No.: US 10,231,039 B2
(45) Date of Patent: Mar. 12, 2019

(54) ROCK SPEAKER

(71) Applicant: Alpine Corporation, Los Angeles, CA (US)

(72) Inventor: Sohrab Robby Soofer, Beverly Hills, CA (US)

(*) Notice: Subject to any disclaimer, the term of this patent is extended or adjusted under 35 U.S.C. 154(b) by 15 days.

(21) Appl. No.: 15/427,006

(22) Filed: Feb. 7, 2017

(65) Prior Publication Data
US 2017/0230739 A1 Aug. 10, 2017

Related U.S. Application Data

(63) Continuation-in-part of application No. 29/579,611, filed on Sep. 30, 2016.

(60) Provisional application No. 62/292,767, filed on Feb. 8, 2016.

(51) Int. Cl.
| | |
|---|---|
| H02J 7/35 | (2006.01) |
| H04R 1/02 | (2006.01) |
| H04R 1/44 | (2006.01) |
| H04R 3/00 | (2006.01) |
| H04R 7/12 | (2006.01) |
| H02S 40/38 | (2014.01) |

(52) U.S. Cl.
CPC ............ *H04R 1/025* (2013.01); *H02J 7/355* (2013.01); *H02S 40/38* (2014.12); *H04R 3/00* (2013.01); *H04R 1/023* (2013.01); *H04R 1/44* (2013.01); *H04R 7/127* (2013.01); *H04R 2420/07* (2013.01); *H04R 2420/09* (2013.01)

(58) Field of Classification Search
None
See application file for complete search history.

(56) References Cited

U.S. PATENT DOCUMENTS

| | | | | |
|---|---|---|---|---|
| 4,754,852 A * | 7/1988 | Mule | ........................ | H04R 1/02 181/144 |
| 9,232,290 B2 | 1/2016 | Besay | | |
| 2011/0212683 A1* | 9/2011 | Ortiz | ..................... | H04W 56/00 455/3.06 |
| 2012/0300962 A1 | 11/2012 | Devoto | | |
| 2013/0294952 A1* | 11/2013 | Caprathe | ............ | F04D 25/0673 417/411 |
| 2015/0010189 A1* | 1/2015 | Besay | ..................... | H04R 1/028 381/334 |

OTHER PUBLICATIONS

Beige Sandstone 50 W Plastic Outdoor Rock Speaker, accessed on Jan. 7, 2016.
Search links, accessed on Jan. 7 2016.

* cited by examiner

*Primary Examiner* — Yogeshkumar Patel
(74) *Attorney, Agent, or Firm* — Payam Moradian

(57) ABSTRACT

Provided is a speaker simulating a rock comprising: a) a housing simulating a rock, the housing having a plurality of openings; b) a loudspeaker placed inside of the housing, audio from the loudspeaker leaving the housing through the openings; c) a solar panel attached to the housing in a configuration that allows light from outside of the housing to contact the solar panel to generate electricity; d) a rechargeable battery to be charged by the electricity from the solar panel, the rechargeable battery powering the loudspeaker; e) a wireless processor configured to communicate with a wireless protocol to obtain audio content; wherein the speaker plays the audio content received from the wireless communication through the loudspeaker.

11 Claims, 7 Drawing Sheets